(No Model.)
J. E. SWEET.
CROSS HEAD FOR ENGINES, &c.
No. 264,368. Patented Sept. 12, 1882.
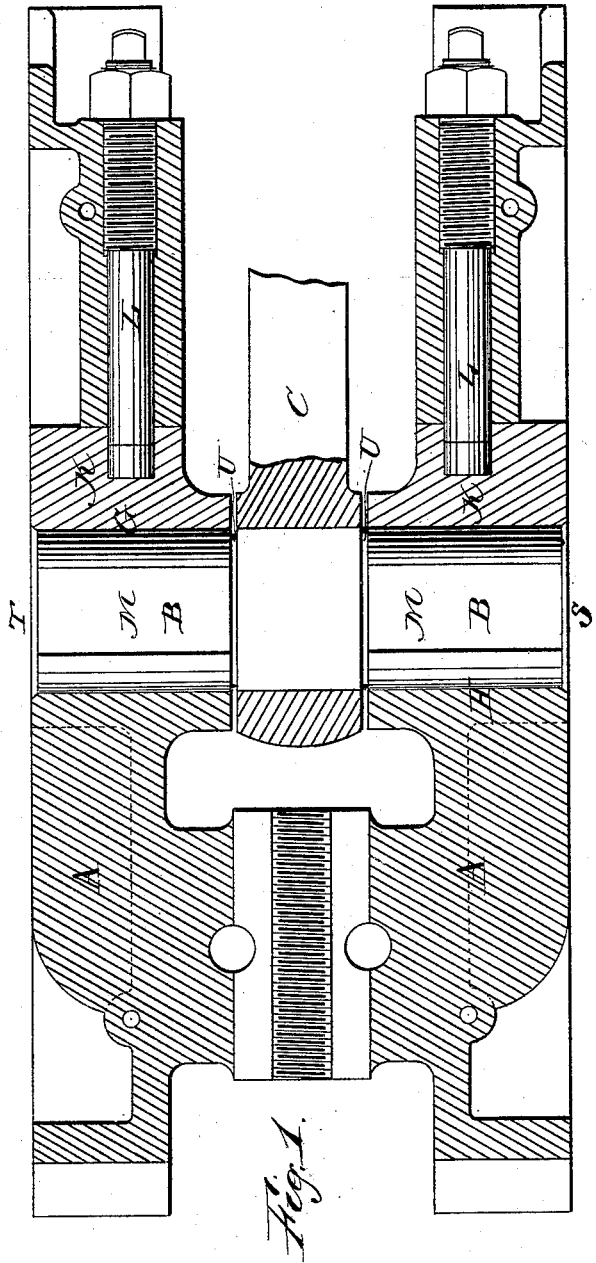
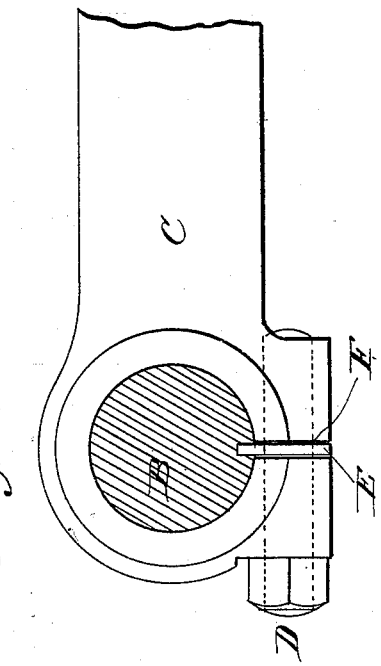
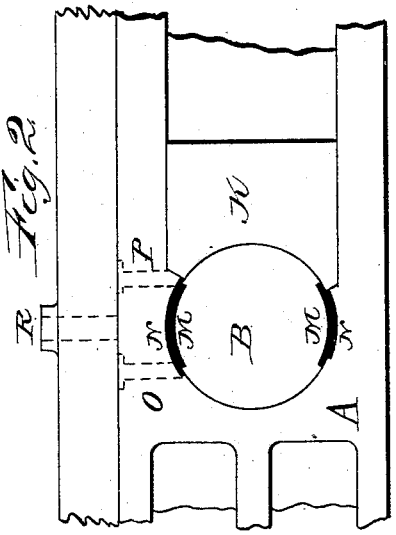
WITNESSES:
INVENTOR
John E. Sweet
BY Boyd Eliot
ATTORNEY

UNITED STATES PATENT OFFICE.

JOHN E. SWEET, OF SYRACUSE, NEW YORK.

CROSS-HEAD FOR ENGINES, &c.

SPECIFICATION forming part of Letters Patent No. 264,368, dated September 12, 1882.

Application filed December 16, 1881. (No model.)

*To all whom it may concern:*

Be it known that I, JOHN E. SWEET, residing at Syracuse, county of Onondaga, and State of New York, have invented certain new and useful Improvements in Cross-Heads for Engines, &c., of which the following is a specification.

The object of this invention is to secure the greatest durability of the cross-head pin in reciprocating engines, pumps, &c., and insure a thorough lubrication of the working parts; and the invention consists chiefly in fastening the pin firmly in the connecting-rod, and thereby requiring it to work in bearings in the cross-head; and, second, in so shaping the bearings of the pin where it works in the cross-head and the surfaces in which it works that two cylindrical bearing-surfaces may at all times be provided, as will hereinafter appear.

In the drawings, at Figures 1, 2, and 3 are represented portions of the various parts involving the invention.

At A, Fig. 1, is shown a horizontal section of the cross-head with the pin B in plan.

At Fig. 2 the cross-head is shown in elevation, with an end view of the pin.

A portion of the connecting-rod is shown at C, Fig. 3, with the pin B in section.

The portion of the connecting-rod for holding the pin is formed in the usual manner, with a round hole for the pin, and with a slot on the under side and a binding-screw at D to compress it firmly; but to efficiently prevent the pin from turning in the rod a flat key at E is introduced through the slot, and its inner end extends into a groove in the pin, as at F, and said key is held in position by the binding-screw passing through it. The result of such a construction is that instead of the pin being permitted to move in the connecting-rod at each reciprocation, and where it has comparatively a small bearing-surface, it is made to work in long bearing-surfaces in the cross-head, as shown at G and H, Fig. 1. These I usually make of cast-iron by boring the holes for the pin in the casting of the cross-head; but to compensate for the wear of the bearings following-blocks, as at K, may be inserted in the cross-head and adjusted by set-screws, as at L, Figs. 1 and 2; but as the cross-head pins are subjected to wear on two sides only, the consequence is that free play is given in one direction, while a close fit is had at a right angle to it, and when the lost motion is taken up by closing the box the result is an oval pin working in an oval hole, thereby causing a binding action. This defect may be overcome by removing a portion of the bearing-surfaces of the pin and those in the cross-head, as shown at M and N, in Fig. 2; or, in other words, forming a recess in the pin and cross-head nearly or quite equal to the extent that they do not have any working action; but, as it is evident the under side of the pin has more to do than the upper, owing to the weight of the connecting-rod, it should be cut away the least, as also that part of the bearing in the cross-head, and the extent of these reductions may be easily determined by observing the reciprocations of the pin in its bearings and then removing the metal to such an extent that the working-surfaces will overlap or pass each other at every reciprocation, as the slides are required to do on all properly-constructed machines, the result of which is that the entire working-surfaces are subjected to the same wear throughout, and in the case of the pins will continue to preserve their true cylindrical form. At the upper extremities of these recesses vertical oil-holes are formed in the cross-head, as at O and P, to conduct oil to the bearings from a hole in the upper slide, as at R, by which the working-bearings may be oiled without stopping the engine.

Another feature of value in the construction of such pins consists in making them a little shorter than the width of the cross-head, as shown at S and T, and then forming a slight groove around the pin at each side of the connecting-rod, as shown at U, the width of the groove being less than the space for it to work in the cross-head, so that the pin can work slightly endwise and in conformity with the same rule as for all sliding surfaces already explained. The result of such a feature is that the two combined motions prevent the formation of grooves in the bearing-surfaces and greatly add to their durability, and specially in the case of high-speed engines.

It is evident that these improvements are equally applicable to all kinds of machines where reciprocating connecting-rods are attached to cross-heads.

I therefore claim—

1. In a reciprocating rod for connecting a cross-head to a crank, the combination of the cylindrical pin, corresponding strap, binding-screw, and key for holding the pin firmly in the connecting-rod, as hereinbefore set forth.

2. The combination of the connecting-rod, a recessed pin, and recessed bearings in the cross-head, as and for the purposes hereinbefore set forth.

3. The combination of the recessed pin, recessed bearings in the cross-head, and one or more oil-holes through the upper portion of the cross-head, as hereinbefore set forth.

4. A cross-head pin firmly fastened in the connecting-rod, with a groove on each side of the rod, and with spaces between the rod and the cross-head for the pin to work endwise, as hereinbefore set forth.

In witness whereof I have hereunto subscribed my name and affixed my seal in the presence of two subscribing witnesses.

JOHN E. SWEET. [L. S.]

Witnesses:
EUGENE N. ELIOT,
BOYD ELIOT.